(12) United States Patent
Brew et al.

(10) Patent No.: US 11,302,967 B2
(45) Date of Patent: Apr. 12, 2022

(54) LOW-VOLTAGE MICROBATTERY

(71) Applicant: International Business Machines Corporation, Armonk, NY (US)

(72) Inventors: Kevin W. Brew, Albany, NY (US); Oki Gunawan, Westwood, NJ (US); Saurabh Singh, Queens, NY (US); Teodor K. Todorov, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 15/871,488

(22) Filed: Jan. 15, 2018

(65) Prior Publication Data
US 2019/0221890 A1     Jul. 18, 2019

(51) Int. Cl.
| | | |
|---|---|---|
| *H01M 10/0585* | (2010.01) | |
| *H01M 10/0525* | (2010.01) | |
| *H01M 10/0562* | (2010.01) | |
| *H01M 4/04* | (2006.01) | |
| *H01M 4/131* | (2010.01) | |
| *H01M 4/48* | (2010.01) | |

(Continued)

(52) U.S. Cl.
CPC ....... *H01M 10/0585* (2013.01); *H01M 4/049* (2013.01); *H01M 4/0445* (2013.01); *H01M 4/0459* (2013.01); *H01M 4/131* (2013.01); *H01M 4/483* (2013.01); *H01M 4/525* (2013.01); *H01M 4/661* (2013.01); *H01M 4/663* (2013.01); *H01M 10/049* (2013.01); *H01M 10/0525* (2013.01); *H01M 10/0562* (2013.01); *H01M 2220/30* (2013.01); *H01M 2300/0071* (2013.01)

(58) Field of Classification Search
CPC .. H01M 4/0457; H01M 4/044; H01M 4/0452; H01M 4/52; H01M 4/663; H01M 4/64; H01M 10/0585; H01M 10/049; H01M 10/0525; H01M 10/0562; H01M 2300/0071; H01M 2220/30; H01M 4/0445; H01M 4/131; H01M 4/525; H01M 4/661; H01M 4/049; H01M 4/0459; H01M 4/483; H01M 4/669; H01M 4/0442; H01M 4/0447; H01M 4/045; H01M 2300/0068
See application file for complete search history.

(56) References Cited

U.S. PATENT DOCUMENTS

| | | | |
|---|---|---|---|
| 4,675,260 A | 6/1987 | Sakurai et al. | |
| 6,280,697 B1 * | 8/2001 | Zhou ..................... | B82Y 40/00 423/414 |

(Continued)

OTHER PUBLICATIONS

Harrison et al., "Chemical and Electrochemical Lithiation of UVOP04 Cathodes for Lithium-Ion Batteries," Chemistry of Materials, 2014, 26, 3849-3861. (Year: 2014).*

(Continued)

*Primary Examiner* — Matthew W Van Oudenaren
(74) *Attorney, Agent, or Firm* — Randall Bluestone; Michael J. Chang, LLC

(57) ABSTRACT

Low-voltage rechargeable microbatteries are provided. In one aspect, a method of forming a microbattery includes: forming a cathode on a substrate, wherein the cathode includes a lithium intercalated material; forming a solid electrolyte on the cathode; forming an anode on the solid electrolyte; and forming a negative contact on the anode. A microbattery is also provided.

22 Claims, 4 Drawing Sheets

FIG. 3 or FIG. 4

(51) Int. Cl.
*H01M 4/525* (2010.01)
*H01M 4/66* (2006.01)
*H01M 10/04* (2006.01)

(56) References Cited

U.S. PATENT DOCUMENTS

| | | | |
|---|---|---|---|
| 8,722,227 | B2 | 5/2014 | Chiang et al. |
| 8,815,450 | B1 | 8/2014 | Bates |
| 9,466,830 | B1 | 10/2016 | Shan et al. |
| 2006/0063072 | A1* | 3/2006 | Li .................... B82Y 30/00 |
| | | | 429/245 |
| 2008/0299457 | A1* | 12/2008 | Muraoka ............ H01M 4/525 |
| | | | 429/217 |
| 2009/0081553 | A1* | 3/2009 | Kondo ................ H01M 2/021 |
| | | | 429/314 |
| 2011/0111281 | A1* | 5/2011 | Bouillon ........... H01M 4/0421 |
| | | | 429/152 |
| 2011/0289767 | A1* | 12/2011 | Yamazaki .......... H01M 4/0428 |
| | | | 29/623.1 |
| 2012/0052382 | A1* | 3/2012 | Yoshida ............. H01M 4/043 |
| | | | 429/211 |
| 2012/0164499 | A1 | 6/2012 | Chiang et al. |
| 2014/0377651 | A1* | 12/2014 | Kwon ............... H01M 10/0422 |
| | | | 429/217 |
| 2015/0072215 | A1* | 3/2015 | Kim ...................... C23C 14/562 |
| | | | 429/153 |
| 2015/0118574 | A1* | 4/2015 | Visbal .................. H01M 4/131 |
| | | | 429/322 |
| 2015/0180050 | A1* | 6/2015 | Nakashima ....... H01M 10/0562 |
| | | | 429/403 |
| 2016/0149203 | A1* | 5/2016 | Martin .................... G02F 1/155 |
| | | | 429/246 |

OTHER PUBLICATIONS

Nitta et al., "Li-ion battery materials: present and future," Materials Today, vol. 18, No. 5, pp. 252-264 (Jun. 2015).

Sakuda et al., "Sulfide Solid Electrolyte with Favorable Mechanical Property for All-Solid-State Lithium Battery," Scientific Reports, 3:2261 (Jul. 2013) (5 pages).

J.F.M. Oudenhoven, et al., "All-Solid-State Lithium-Ion Microbatteries: A Review of Various Three-Dimensional Concepts," Adv. Energy Mater. 2011, 1, 10-33 (published Nov. 2010).

* cited by examiner

LOW-VOLTAGE MICROBATTERY

FIELD OF THE INVENTION

The present invention relates to rechargeable batteries, and more particularly, to low-voltage rechargeable microbatteries.

BACKGROUND OF THE INVENTION

Traditional lithium (Li) ion batteries aim for high voltages, often above 3 volts (V). Advances in small electronic devices have, however, reduced voltage requirements making it possible to operate these devices at values below 1V.

Thus for these applications, traditional Li ion batteries have become redundant and inefficient to recharge. This is especially relevant when alternative energy sources, such as photovoltaic devices, are used to recharge the battery.

Further, for compatibility with powering small electronic devices, the size of the batteries also needs to be reduced which brings about a number of notable challenges. For instance, the use of a conventional liquid electrolyte design limits scaling capabilities.

Therefore, improved low-voltage microbattery designs would be desirable.

SUMMARY OF THE INVENTION

The present invention provides low-voltage rechargeable microbatteries. In one aspect of the invention, a method of forming a microbattery is provided. The method includes the steps of: forming a cathode on a substrate, wherein the cathode includes a lithium intercalated material; forming a solid electrolyte on the cathode; forming an anode on the solid electrolyte; and forming a negative contact on the anode.

In another aspect of the invention, a microbattery is provided. The microbattery includes: a substrate; a cathode disposed on the substrate, wherein the cathode includes a lithium intercalated material; a solid electrolyte disposed on the cathode; and a negative contact disposed on the anode. Optionally particles of the solid electrolyte are intermixed with electrode particles in at least one of the cathode and the anode.

A more complete understanding of the present invention, as well as further features and advantages of the present invention, will be obtained by reference to the following detailed description and drawings.

DETAILED DESCRIPTION OF PREFERRED EMBODIMENTS

A provided above, scaled battery designs are needed for powering small electronic devices. For instance, such devices might include wearable electronic devices or internet of things (IOT) devices which are small, often portable, and require commensurate sized microbattery designs. A "microbattery" is a miniaturized battery having dimensions, for example, that are less than about 5 millimeters (mm).

However, creating a miniaturized battery presents some notable design challenges. For instance, conventional lithium (Li) batteries employ a liquid electrolyte between a cathode and an anode electrode. The presence of a liquid electrolyte, however, does not lend itself well to scaling. Thus, the use of solid state batteries has gained prominence.

A solid state battery employs a solid electrolyte, instead of a liquid. Solid state batteries are easier to miniaturize as they can be fabricated as thin film stacks. One notable drawback to a solid state battery design, however, is that a solid electrolyte is not as conductive to ions as is its liquid counterpart.

Advantageously, the present techniques provide rechargeable solid state Li ion microbattery designs incorporating conductive paths for Li ions within the thin film stack that bypass the resistivity of the electrode/electrolyte. The present microbatteries operate at less than 1 volt (V) and as such are well suited for small electronic device applications.

Figure 1:
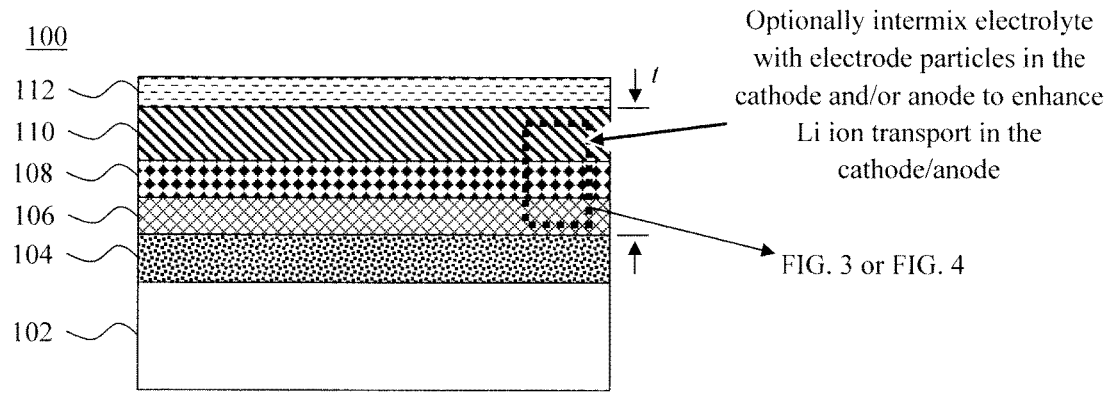
FIG. 1 is a cross-sectional diagram illustrating an exemplary configuration of the present microbattery according to an embodiment of the present invention.

An exemplary configuration of the present microbattery 100 is shown in FIG. 1. Microbattery 100 includes a substrate 102, a (positive) contact 104 disposed on the substrate 102, a cathode 106 disposed on the contact 104, a solid electrolyte 108 disposed on the cathode 106, an anode 110 disposed on the solid electrolyte 108, and a (negative) contact 112 disposed on the anode 110.

Electrically conductive or non-conductive substrates 102 may be employed. With the latter, the use of a separate contact 104 is necessary to form a contact with the cathode 106. Electrically conductive substrates 102 can serve as the physical substrate for the battery stack, as well as the (positive) contact to the cathode 106. However, configurations are contemplated herein where (an electrically conductive) substrate 102 is used in conjunction with a separate/distinct contact 104 disposed thereon.

Suitable substrate materials include, but are not limited to, glass, ceramic (such as alumina—$Al_2O_3$), polymer (such as polyethylene, polypropylene, polycarbonate, or polyimide), semiconductor (such as silicon (Si)), and (electrically conductive) metal foil substrates. Suitable metal foil substrates include, but are not limited to, copper, vanadium, steel, aluminum, and/or nickel foils.

A metal or combination of metals can be used to, when needed, form contact 104 on substrate 102. Suitable contact metals include, but are not limited to, copper, vanadium, steel, aluminum, indium, and/or nickel.

According to an exemplary embodiment, microbattery 100 is a rechargeable Li ion battery having an intercalated lithium material such as lithium-cobalt-oxide ($LiCoO_2$) LCO as the cathode 106. The layered phase of LCO contains cobalt and lithium located in octahedral sites which occupy alternating layers and form a hexagonal symmetry. See, for example, Nitta et al., "Li-ion battery materials: present and future," Materials Today, Volume 18, Number 5, pgs. 252-264 (June 2015) (hereinafter "Nitta"), the contents of which are incorporated by reference as if fully set forth herein. As described in Nitta, layered LCO provides a number of favorable properties when used as a cathode material, such as low self-discharge, high discharge voltage, and good cycling performance. Catalyst-based techniques for forming layered LCO are described, for example, in U.S. patent application Ser. No. 15/631,723, by Brew et al., entitled "Low Temperature Method of Forming Layered HT-Li-$CoO_2$," the contents of which are incorporated by reference as if fully set forth herein.

According to an exemplary embodiment, the solid electrolyte 108 includes a Li ion-based electrolyte material. Suitable Li ion-based electrolyte materials include, but are not limited to, lithium lanthanum titanium oxide (Li—La—Ti—O), lithium niobium oxide (Li—Nb—O), and/or lithium tantalum oxide (Li—Ta—O).

As provided above, while solid electrolytes are well suited for use in microbattery stacks there is a tradeoff in ionic conductivity when compared to their liquid electrolyte counterparts where the electrolyte provides fast Li ion transport not only in the interelectrode space but also within the porous cathode and anode. Optionally, according to one exemplary embodiment, the electrolyte particles can be intermixed with electrode particles in the cathode 106 and/or anode 110. As compared to the electrode particles, the solid electrolyte is relatively electrically insulating but with higher Li ion conductivity. Thus, introducing electrolyte particles into the electrodes (i.e., cathode 106 and/or anode 110) creates Li ion conductive paths in the electrodes which enhances battery characteristics such as cycling performance. It is preferable, however, to have a pure (not-intermixed) electrolyte 108 (in between the cathode 106 and/or anode 110) or, if there is a solid component, it should be an inert porous membrane or particles that have the sole role in preventing shunting (shorting) between the cathode 106 and anode 110.

Electrolyte particles which may be introduced to create ion conductive paths in the electrode materials include, but are not limited to, LCO, titanium oxide, and/or carbon-based particles such as graphite, carbon nanowires and/or carbon nanotubes. As will be described in detail below, the electrolyte particles may be simply intermixed with the electrode particles, or the electrode particles can serve as a core around which the solid electrolyte is coated (see, for example, the process described in Sakuda et al., "Sulfide Solid Electrolyte with Favorable Mechanical Property for All-Solid-State Lithium Battery," Scientific Reports, 3:2261 (July 2013) (5 pages) (hereinafter "Sakuda"), the contents of which are incorporated by reference as if fully set forth herein).

Suitable materials for the anode 110 include, but are not limited to, vanadium-based materials such as vanadium oxide ($V_2O_5$), LCO, titanium oxide, and/or carbon-based materials such as graphite, carbon nanowires and/or carbon nanotubes. According to an exemplary embodiment, the cathode 106, solid electrolyte 108, and anode 110, have a combined thickness t of from about 1.5 micrometers (µm) to about 3 µm, and ranges therebetween. See FIG. 1. As provided above, the present battery design is ideal for scaled microbattery applications.

According to an exemplary embodiment, the (negative) contact 112 is formed from a conductive carbon paste which is "painted" onto the anode (also referred to herein as "carbon paint"). Carbon paints are commercially available, for example, from Structure Probe, Inc., West Chester, Pa. Alternatively, the negative contact 112 can be formed from a metal or combination of metals. Suitable contact metals include, but are not limited to, copper, vanadium, steel, aluminum, indium, and/or nickel.

Figure 2:
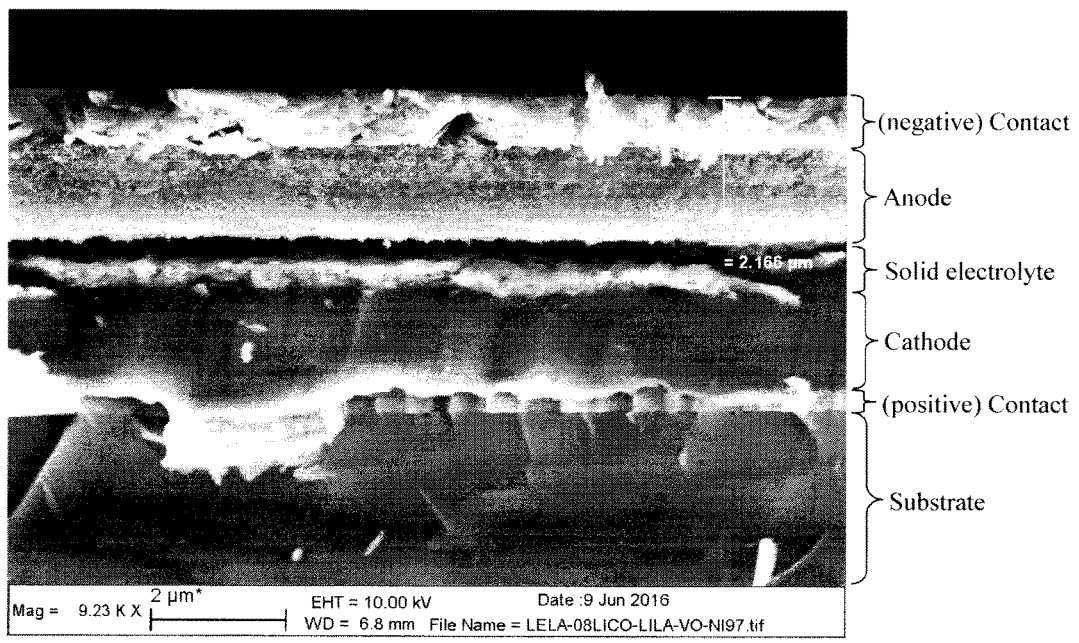
FIG. 2 is a cross-sectional scanning electron micrograph (SEM) image of a microbattery in accordance with the present techniques according to an embodiment of the present invention.

A cross-sectional scanning electron micrograph (SEM) image of a microbattery in accordance with the present techniques is shown in FIG. 2. As shown in FIG. 2, the microbattery includes a substrate, a (positive) contact disposed on the substrate, a cathode disposed on the positive contact, a solid electrolyte disposed on the cathode, an anode disposed on the solid electrolyte, and a (negative) contact disposed on the anode.

In the example shown in FIG. 2, the substrate includes a silicon wafer onto which a nickel (positive contact) is coated. The cathode is LCO, the solid electrolyte is lithium lanthanum titanium oxide (Li—La—Ti—O), and the anode is vanadium oxide ($V_2O_5$).

Figure 3:
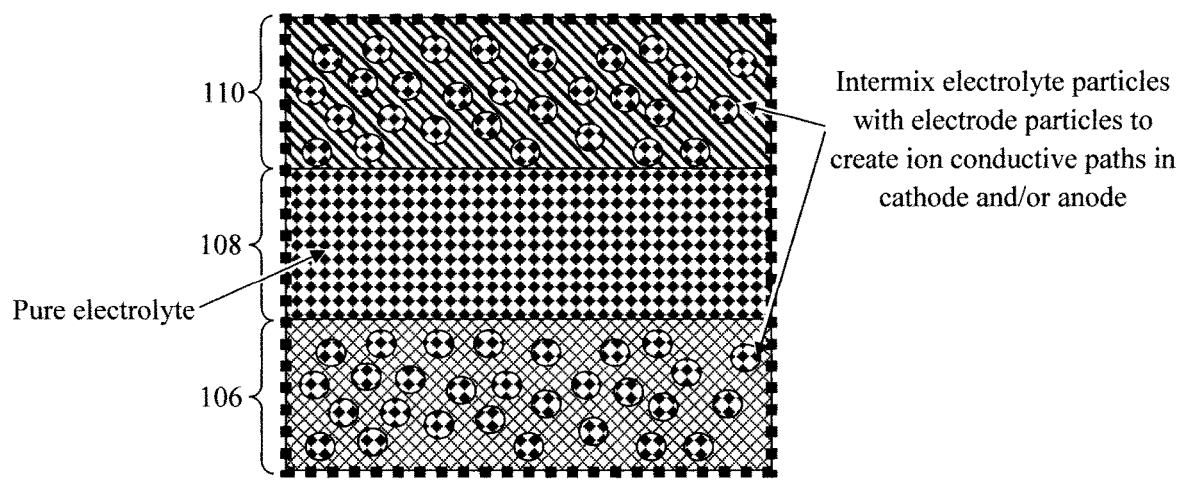
FIG. 3 is an enlarged view diagram illustrating electrode particles intermixed with the solid electrolyte according to an embodiment of the present invention.
Figure 4:
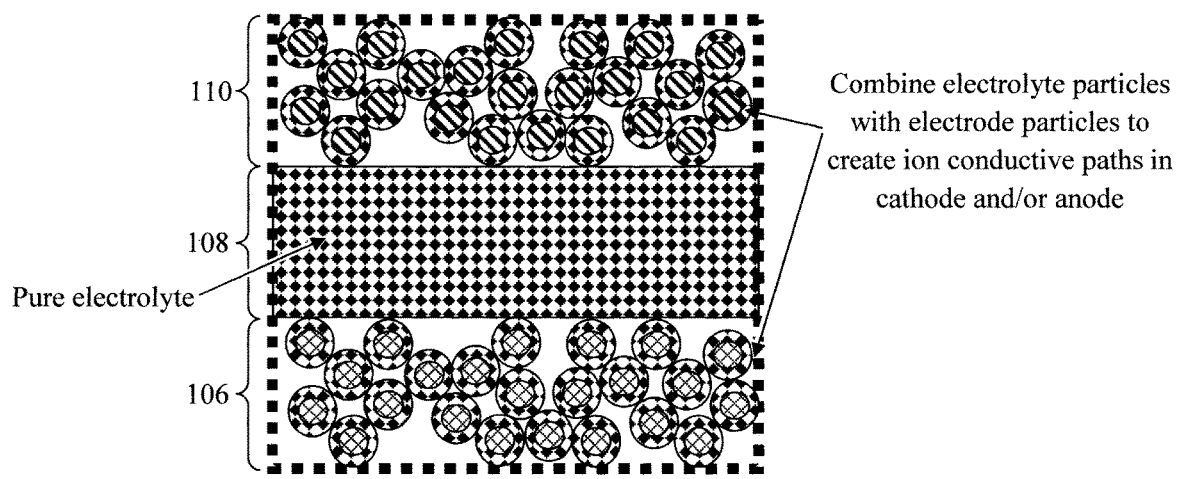
FIG. 4 is an enlarged view diagram illustrating the solid electrolyte having been formed as a shell around an electrode particle core according to an embodiment of the present invention.

As provided above, electrolyte particles may optionally be intermixed (or otherwise combined) with the electrode particles in the cathode 106 and/or anode 110 to thereby create lithium ion conductive paths in the cathode 106 and/or anode 110 which enhances battery characteristics such as cycling performance. See, for example, FIGS. 3 and 4 which provide enlarged views of the cathode 106, solid electrolyte 108, and anode 110 (see FIG. 1). As provided above, it is however preferable to have a pure (not-intermixed) electrolyte 108 (in between the cathode 106 and/or anode 110). Suitable electrode particles include, but are not limited to: LCO, titanium oxide, and/or carbon-based particles such as graphite, carbon nanowires and/or carbon nanotubes. In the example depicted in FIG. 3, the electrolyte particles are intermixed with the electrode particles in the cathode 106 and in the anode 110. However, embodiments are contemplated herein where the intermixing occurs in one (but not both of the) cathode 106 and the anode 110. In the example depicted in FIG. 4, the solid electrolyte is formed as a shell around the electrode particle core in the cathode 106 and in the anode 110. Again, embodiments are contemplated herein where the electrode and electrolyte particles are combined in one (but not both of the) cathode 106 and the anode 110. It is notable that, as described in Sakuda, pressing the shell/core particles of FIG. 4 together can result in a more uniform layer of solid electrolyte with intermixed electrode particles as illustrated in FIG. 3.

Figure 5:
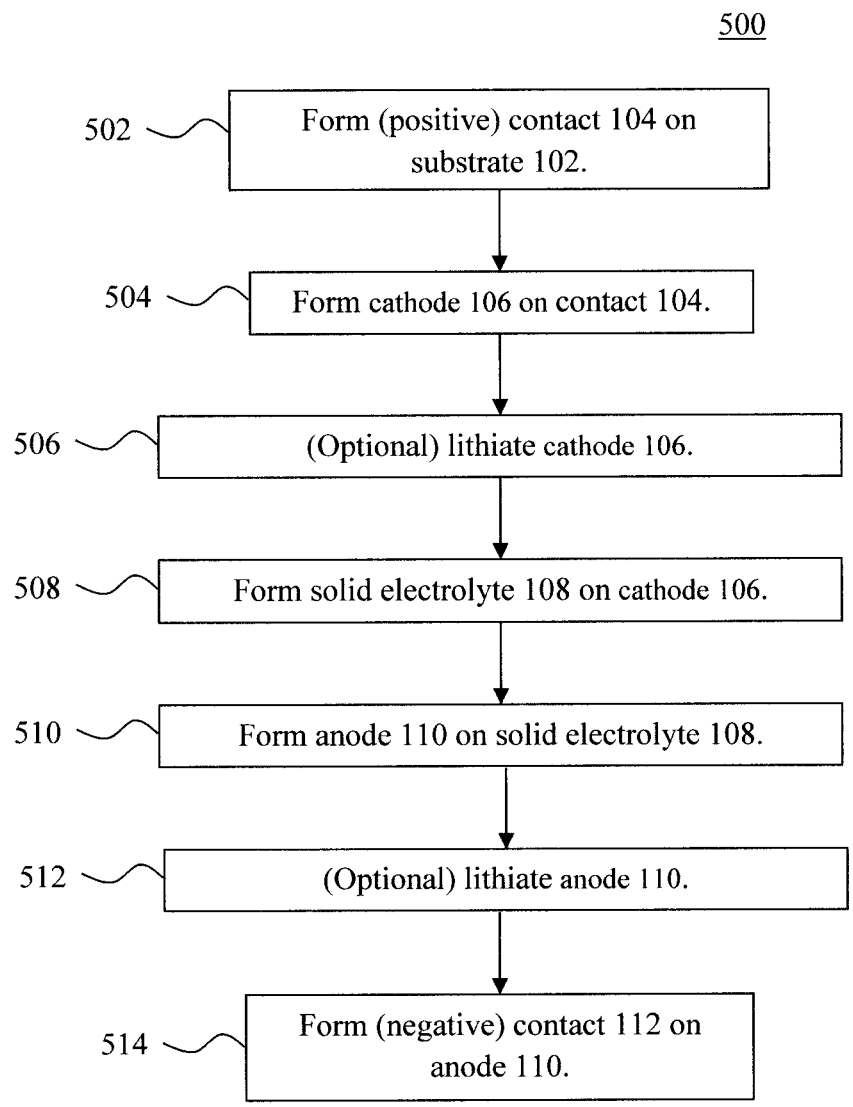
FIG. 5 is a diagram illustrating an exemplary methodology for forming a microbattery according to an embodiment of the present invention.

FIG. 5 is a diagram illustrating an exemplary methodology 500 for forming the present microbattery. The process begins, as provided above, with a substrate 102. Depending on whether the substrate 102 is itself electrically conductive or electrically non-conductive, a (positive) contact 104 can optionally be formed on the substrate 102. See step 502.

Namely, as provided above, substrate 102 may be formed from (electrically non-conductive) glass, ceramics, polymers, semiconductors, and (electrically conductive) metal foils including, but not limited to, copper, vanadium, steel, aluminum, and/or nickel. With the electrically non-conductive options, a (positive) contact 104 needs to be formed on the substrate 102 as a bottom electrode of the battery. However, even with an electrically conductive substrate it may be desirable to additionally employ a separate/distinct (positive) contact 104 on the substrate 102. In either case, the (positive) contact 104 can be formed on the substrate 102 using a process such as electroplating.

In step 504, a cathode 106 is formed on the (positive) contact 104, if present, or directly on the substrate 102. As provided above, suitable cathode materials include, but are not limited to, lithium intercalated materials such as LCO. LCO can be deposited from solution (by a casting process) or, for example, using evaporation. The deposited LCO can then be annealed. LCO has two distinct phases. One phase is the spinel Fd3m low temperature (LT) phase and the other is the layered R-3m high temperature (HT) phase. The spinel LT phase is formed by annealing the LCO at a temperature of from about 300° C. to about 400° C. and ranges therebetween (e.g., at about 400° C.), whereas the layered HT phase is formed by annealing the LCO at a temperature of from about 700° C. to about 800° C. and ranges therebetween (e.g., at about 800° C.). However, the layered LCO phase is desirable for cathode use as it produces low self-discharge, high discharge voltage, and good cycling performance.

Electrolyte particles can optionally be intermixed (or otherwise combined) with the electrode particles in the cathode 106 (and/or anode 110—see below). As provided above, electrolyte particles (e.g., LCO, titanium oxide, and/or carbon-based particles such as graphite, carbon nanowires and/or carbon nanotubes) can be intermixed with the electrode particles to create Li ion conductive paths in the cathode 106. In that case, the electrolyte particles can simply be cast along with the electrode materials onto the (positive) contact 104. The resulting cathode 106 would appear as shown in FIG. 3 with the electrolyte particles being intermixed with the electrode particles in the cathode 106.

Alternatively, as described in Sakuda, a process such as pulsed laser deposition or PLD can be used to coat the electrode particles with the electrolyte. As such, shell/core particles can be formed with the electrolyte as the shell surrounding the electrode particle core. These shell/core particles can be deposited (e.g., cast) onto the (positive) contact 104 forming a layer of the combined electrode particle core/electrolyte shell as the cathode 106 shown in FIG. 4. However, as described in Sakuda, cold pressing (i.e., at room temperature) can be used to compress the shell/core particles forming a continuous (dense without voids) cathode layer of with intermixed electrolyte particles as appears in FIG. 3.

Optionally, lithiation is carried out to introduce Li ions into the cathode 106 and/or anode 110. This lithiation can be performed at one or more different points in the process. For instance, optionally, lithiation of the cathode 106 can be carried out at step 506 (followed by an optional lithiation of the anode 110 following its formation later in the process). Alternatively (or additionally), the entire battery stack (cathode 106 and anode 110 included) can be lithiated at the end of the process—see step 512 described below.

Thus, according to one exemplary embodiment, a lithiation of the cathode is carried out in step 506. This lithiation can be performed via chemical or electrochemical lithiation. For instance, with chemical lithiation the battery stack (at this point the substrate 102, contact 104 and cathode 106) is immersed in a lithium compound solution for a duration of 24 hours or more. See, for example, U.S. Pat. No. 9,466,830 issued to Shan et al., entitled "Method and System for Processing Lithiated Electrode Material," the contents of which are incorporated by reference as if fully set forth herein. Suitable lithium compound solutions include, but are not limited to, an n-butyllithium solution.

Electrochemical lithiation involves submerging the battery stack in a liquid electrolyte along with a Li-containing electrode, and applying a voltage bias to drive Li ions from the Li-containing electrode into the cathode 106 (and/or anode 110). An exemplary electrochemical lithiation process is described in further detail below.

In step 508, the solid electrolyte 108 is formed on the cathode 106. As provided above, suitable electrolytes include, but are not limited to, Li ion-based material such as lithium lanthanum titanium oxide (Li—La—Ti—O), lithium niobium oxide (Li—Nb—O), and/or lithium tantalum oxide (Li—Ta—O). According to an exemplary embodiment, the electrolyte material is dissolved in a suitable solvent (such as ethanol) forming a solution, and then casting the solution onto the cathode.

An anneal is then performed under conditions (temperature, duration, etc.) sufficient to evaporate the solvent thereby forming a solid layer of the electrolyte 108 on the cathode 106. By way of example only, the conditions include a temperature of from about 500° C. to about 600° C., and ranges therebetween, and a duration of from about 1 minute to about 5 minutes, and ranges therebetween.

In step 510, an anode 110 is formed on the solid electrolyte 108. As provided above, suitable materials for the anode 110 include, but are not limited to, vanadium-based materials such as vanadium oxide ($V_2O_5$), LCO, titanium oxide, and/or carbon-based materials such as graphite, carbon nanowires and/or carbon nanotubes. One or more of these materials or precursors thereof can be dissolved in a suitable solvent, such as ethanol, to form a solution. The solution is then cast onto the solid electrolyte 108, followed by an anneal under conditions (temperature, duration, etc.) sufficient to evaporate the solvent leaving behind a solid layer of the anode 110 on the solid electrolyte 108. By way of example only, the conditions include a temperature of from about 500° C. to about 600° C., and ranges therebetween, and a duration of from about 1 minute to about 5 minutes, and ranges therebetween.

Electrolyte particles can optionally be intermixed (or otherwise combined) with the electrode particles in the anode 110 (and/or cathode 106—see above). As provided above, electrolyte particles (e.g., LCO, titanium oxide, and/or carbon-based particles such as graphite, carbon nanowires and/or carbon nanotubes) can be intermixed with the electrode particles to create Li ion conductive paths in the anode 110. In that case, the electrolyte particles can simply be cast along with the electrode materials onto the solid electrolyte 108. The resulting anode 110 would appear as shown in FIG. 3 with the electrolyte particles being intermixed with the electrode particles in the anode 110.

Alternatively, as described in Sakuda, a process such as PLD can be used to coat the electrode particles with the electrolyte. As such, shell/core particles can be formed with the electrolyte as the shell surrounding the electrode particle core. These shell/core particles can be deposited (e.g., cast) onto the solid electrolyte 108 forming a layer of the combined electrode particle core/electrolyte shell as the anode 110 shown in FIG. 4. However, as described in Sakuda, cold pressing (i.e., at room temperature) can be used to compress the shell/core particles forming a continuous (dense without voids) anode layer of with intermixed electrolyte particles as appears in FIG. 3.

Now is another point in the process where the above-described chemical/electrochemical lithiation can optionally be performed, i.e., after both the cathode 106 and anode 110 have been formed. See step 512. As highlighted above, lithiating at this stage is not exclusive to it being performed at other times in the process. For instance, chemical/electrochemical lithiation may be performed right after cathode 106 formation (as per step 506), after anode 110 formation (as per step 512), or both.

Finally, in step 514 the (negative) contact 112 is formed on the anode 110. As provided above, the (negative) contact 112 can be formed from a conductive carbon paste which is "painted" onto the anode 110. For instance, the conductive carbon paste can be painted onto the anode 110 with a brush followed by an anneal. By way of example only, the anneal can be performed in air at a temperature of from about 500° C. to about 600° C., and ranges therebetween, for a duration of from about 1 minute to about 5 minutes, and ranges therebetween (e.g., for about 1 minute).

Alternatively, the negative contact 112 can be formed from a metal or combination of metals. Suitable contact metals include, but are not limited to, copper, vanadium, steel, aluminum, indium, and/or nickel, which can be deposited onto the anode 110 by vacuum deposition, paste coating, or mechanical pressing of a foil. Mechanical pressing, for example, involves placing a foil (of the above-provided metal(s)) onto the anode 110, and then pressing the back side of the foil (e.g., using a roller) to adhere the metal foil to the anode 110.

As provided above, chemical/electrochemical lithiation of the microbattery stack may be performed at one or more various times during the fabrication process. Chemical lithiation may involve immersing the microbattery stack in a solution of a lithium compound solution such as an n-butyl-lithium solution for a duration of 1 minute to 24 hours.

Figure 6:
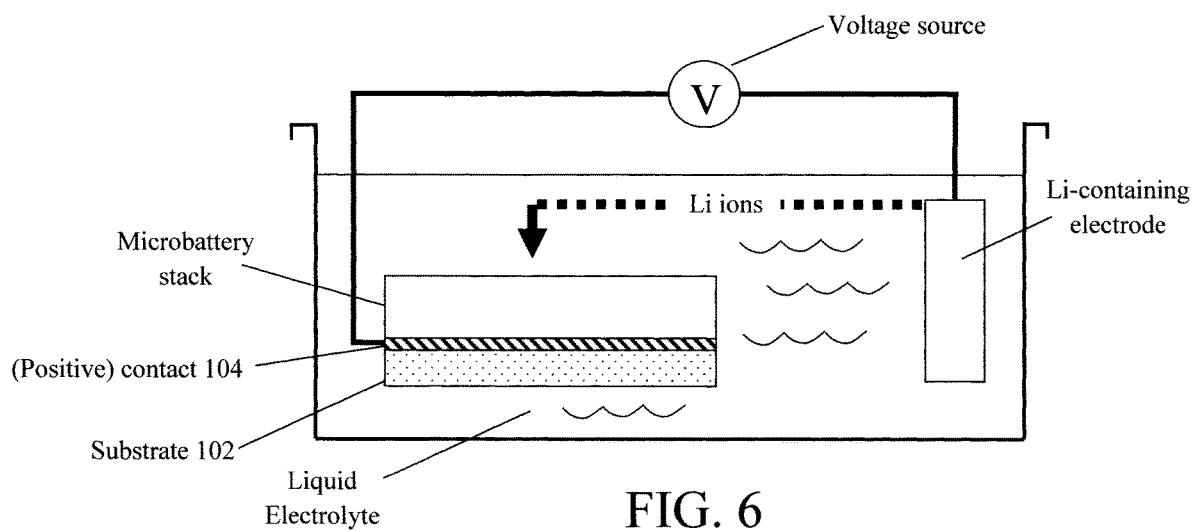
FIG. 6 is a diagram illustrating electrochemical lithiation of a microbattery stack according to an embodiment of the present invention.

Electrochemical lithiation, on the other hand, involves submerging the microbattery stack and a Li-containing electrode (as a Li ion source) in an electrolyte, and using a voltage bias to drive Li ions from the electrode into the battery stack. See, for example, FIG. 6. As shown in FIG. 6, the microbattery stack is fully immersed in a liquid electrolyte as is a Li-containing electrode. By way of example only, suitable liquid electrolytes include, but are not limited to, lithium hexafluorophosphate ($LiPF_6$) in ethylene carbonate. The Li-containing electrode can be formed from lithium cobalt oxide ($LiCoO_2$). As described above, this lithiation step can be performed at one or more different points in the process. Thus, the microbattery stack shown in FIG. 6 generically represents the stack built up to that point, e.g., up to formation of the cathode 106 and/or the anode 110.

A voltage source then applies a bias voltage to the microbattery stack (for instance via the contact 104) and to the Li-containing electrode. The applied voltage bias will drive Li ions from the Li-containing electrode into the cathode 106 and/or anode 110. Following lithiation, the microbattery stack is removed from the liquid electrolyte and dried, for example, at a temperature of from about 100° C. to about 150° C., and ranges therebetween (e.g., at about 140° C.) until dry.

As highlighted above, the present microbattery is rechargeable, i.e., it can be charged, discharged (into a load), and recharged multiple times. For recharging, the microbattery is connected to a power source, such as a wall outlet, automobile power source, etc. For portable applications, it may be desirable to use a renewable energy source such as the sun and photovoltaics for recharging the microbattery. See, for example, U.S. patent application Ser. No. 15/281,870 by Antunez et al., entitled "Integrated CZT(S,Se) Photovoltaic Device and Battery," the contents of which are incorporated by reference as if fully set forth herein. Recharging generally involves connecting the positive and negative contacts of the micro-battery to the positive and negative terminals, respectively, of the power source.

Figure 7:
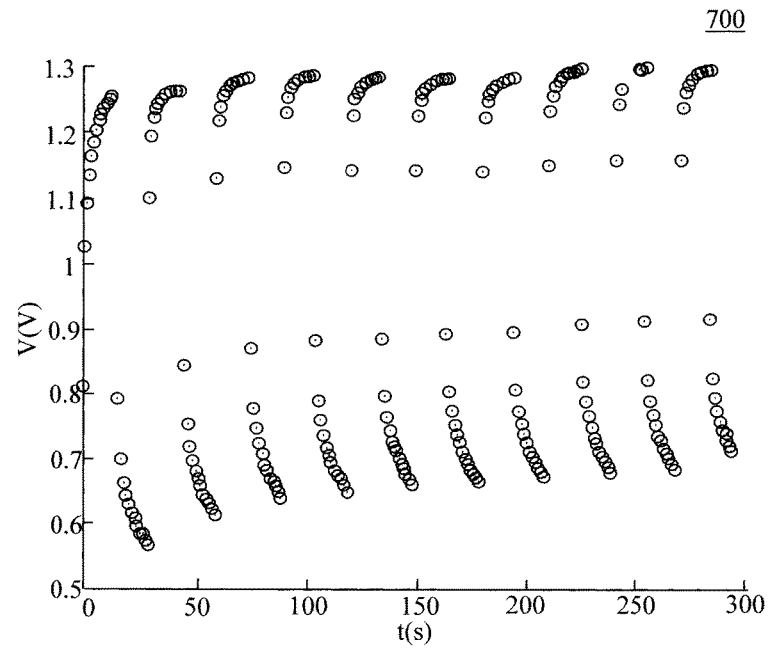
FIG. 7 is a diagram illustrating cycling performance of the present microbattery according to an embodiment of the present invention.

FIG. 7 is a diagram 700 illustrating the cycling performance of the present microbattery whereby a charge at about 1.2 volts (V) and a discharge at from about 0.6V to about 0.8V was measured. Specifically, FIG. 7 displays the charge and discharge values (measured in V) as a function of time t (measured in seconds (s)).

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of forming a microbattery, comprising:
    forming a cathode on a substrate, wherein the cathode comprises a lithium intercalated material;
    forming a solid electrolyte on the cathode;
    forming an anode on the solid electrolyte; and
    forming a negative contact on the anode,
    wherein the method further comprises:
    intermixing particles of the solid electrolyte with electrode particles in both the cathode and the anode, wherein the intermixing comprises forming the solid electrolyte as a shell around a core of the electrode particles, with the shell in direct contact with the core, in both the cathode and the anode, and wherein the shell comprises an individual solid electrolyte coating fully surrounding a given electrode particle core.

2. The method of claim 1, wherein the electrode particles are selected from the group consisting of: lithium-cobalt-oxide particles, titanium oxide particles, carbon-based particles, and combinations thereof.

3. The method of claim 1, wherein the electrode particles comprise carbon-based particles selected from the group consisting of: carbon nanowires, carbon nanotubes, and combinations thereof.

4. The method of claim 1, wherein the substrate is selected from the group consisting of: a glass substrate, a ceramic substrate, a polymer substrate, a semiconductor substrate, and a metal foil substrate.

5. The method of claim 1, wherein the substrate comprises a metal foil substrate selected from the group consisting of: copper foil, vanadium foil, steel foil, aluminum foil, nickel foil, and combinations thereof.

6. The method of claim 1, further comprising:
    forming a positive contact on the substrate.

7. The method of claim 6, wherein the positive contact is formed from a metal selected from the group consisting of: vanadium, steel, indium, and combinations thereof.

8. The method of claim 1, wherein the lithium intercalated material comprises lithium-cobalt-oxide.

9. The method of claim 1, wherein the solid electrolyte comprises a lithium ion-based material selected from the group consisting of: lithium lanthanum titanium oxide, lithium niobium oxide, lithium tantalum oxide, and combinations thereof.

10. The method of claim 1, wherein the anode comprises a material selected from the group consisting of: vanadium oxide, titanium oxide, and combinations thereof.

11. The method of claim 1, wherein the negative contact is formed from a conductive carbon paste, the method further comprising:
    painting the conductive carbon paste onto the anode; and
    annealing the conductive carbon paste to form the negative contact on the anode.

12. The method of claim 1, wherein the negative contact is formed from a metal selected from the group consisting of: vanadium, aluminum, indium, and combinations thereof.

13. The method of claim 1, further comprising:
lithiating the microbattery after both the cathode and the anode have been formed.

14. The method of claim 13, wherein the lithiating is performed using chemical lithiation, the method further comprising:
immersing the microbattery in a lithium compound solution for a duration of greater than or equal to about 24 hours.

15. The method of claim 14, wherein the lithium compound solution comprises an n-butyllithium solution.

16. The method of claim 13, wherein the lithiating is performed using electrochemical lithiation, the method further comprising:
submerging the microbattery in a liquid electrolyte along with a lithium-containing electrode; and
applying a voltage bias to the microbattery and the lithium-containing electrode to drive lithium ions into at least one of the cathode and the anode.

17. The method of claim 16, wherein the lithium-containing electrode comprises lithium-cobalt-oxide.

18. A microbattery, comprising:
a substrate;
a cathode disposed on the substrate, wherein the cathode comprises a lithium intercalated material;
a solid electrolyte disposed on the cathode;
an anode disposed on the solid electrolyte; and
a negative contact disposed on the anode,
wherein particles of the solid electrolyte are intermixed with electrode particles in both the cathode and the anode, wherein the solid electrolyte forms a shell around a core of the electrode particles, with the shell in direct contact with the core, in both the cathode and the anode, and wherein the shell comprises an individual solid electrolyte coating fully surrounding a given electrode particle core.

19. The microbattery of claim 18, further comprising:
a positive contact disposed on the substrate, wherein the positive contact is formed from a metal selected from the group consisting of: vanadium, steel, indium, and combinations thereof.

20. The microbattery of claim 18, wherein the solid electrolyte comprises a lithium ion-based material selected from the group consisting of: lithium lanthanum titanium oxide, lithium niobium oxide, lithium tantalum oxide, and combinations thereof.

21. The microbattery of claim 18, wherein the electrode particles are selected from the group consisting of: lithium-cobalt-oxide particles, titanium oxide particles, carbon-based particles, and combinations thereof.

22. The microbattery of claim 18, wherein the electrode particles comprise carbon-based particles selected from the group consisting of: carbon nanowires, carbon nanotubes, and combinations thereof.

* * * * *